March 31, 1936.   A. H. TREVOR   2,035,730
AIRPLANE KITE
Filed March 9, 1935   2 Sheets-Sheet 1
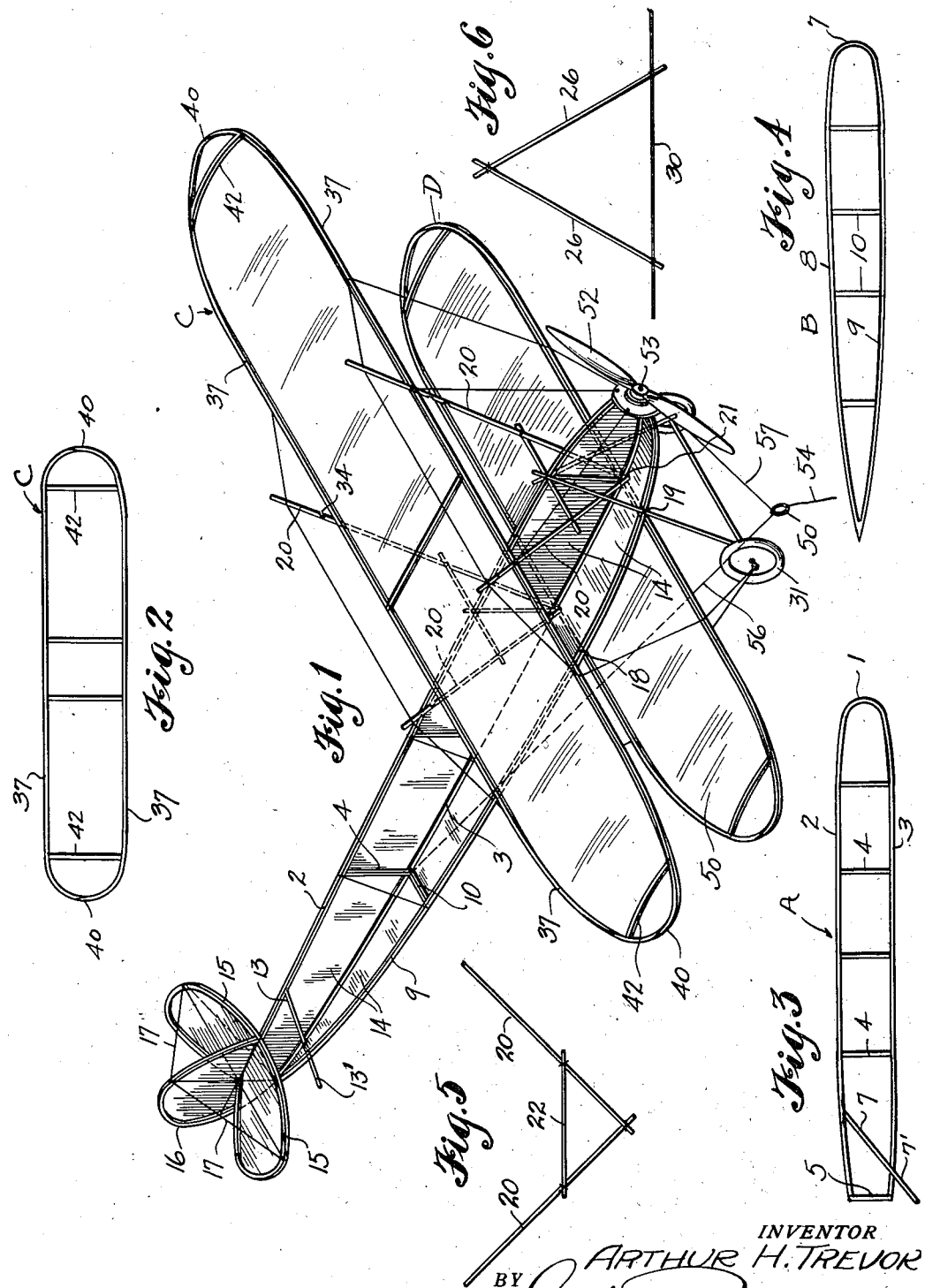
INVENTOR
ARTHUR H. TREVOR
BY
Cook & Robinson
ATTORNEY March 31, 1936.  A. H. TREVOR  2,035,730
AIRPLANE KITE
Filed March 9, 1935    2 Sheets-Sheet 2
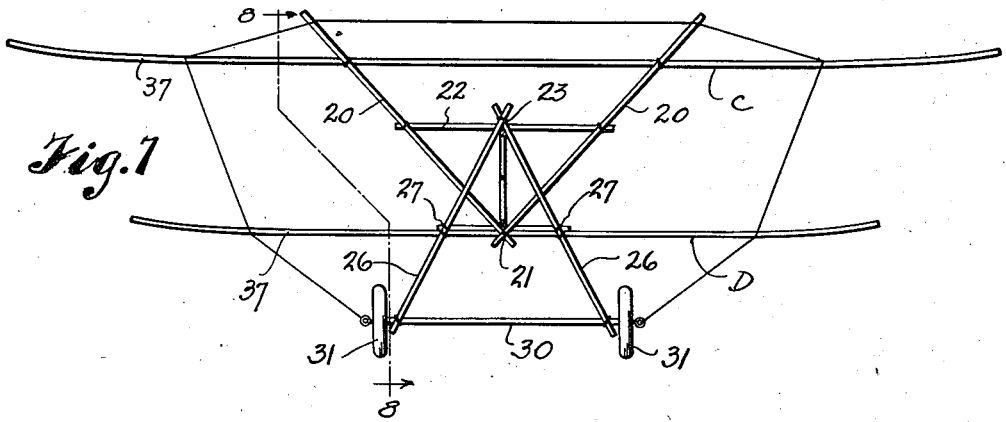
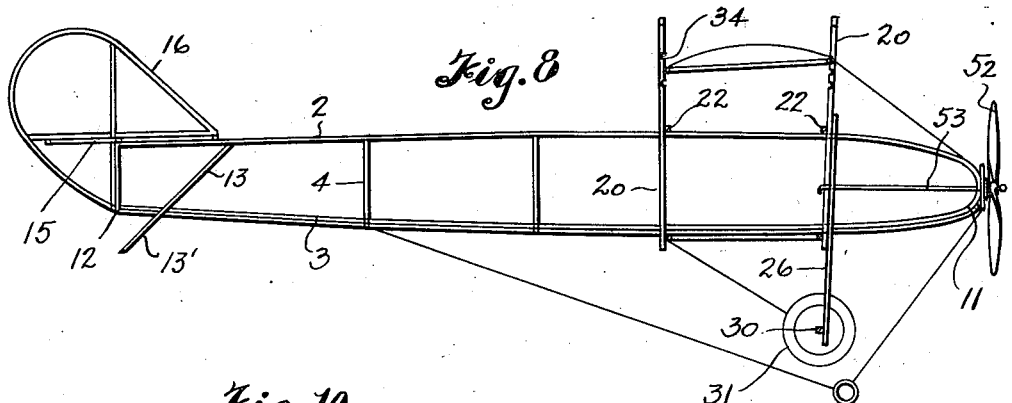
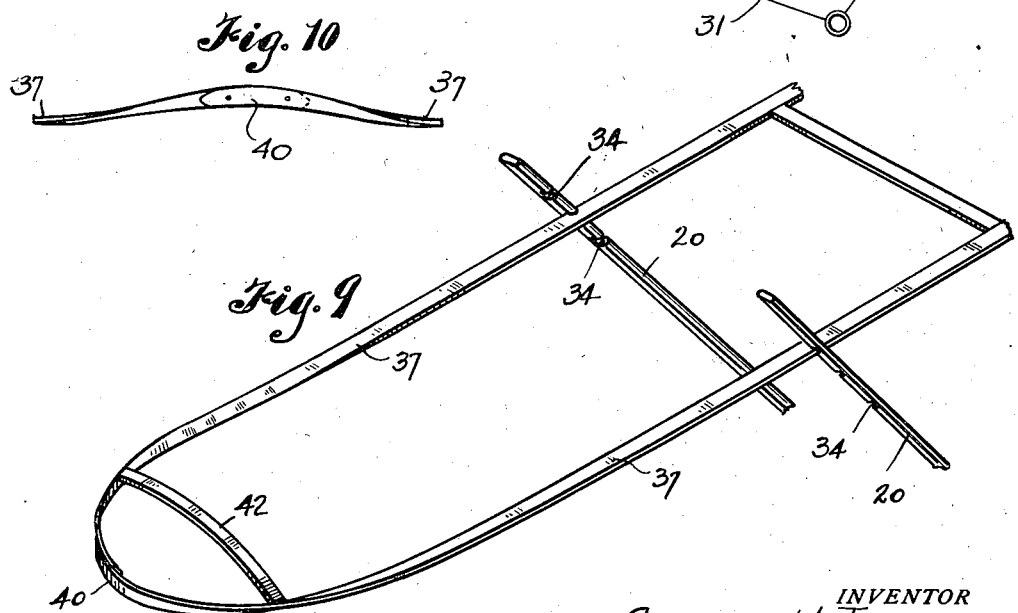
INVENTOR
ARTHUR H. TREVOR
BY Cook & Robinson
ATTORNEY Patented Mar. 31, 1936

2,035,730

UNITED STATES PATENT OFFICE 2,035,730

AIRPLANE KITE

Arthur H. Trevor, Seattle, Wash.

Application March 9, 1935, Serial No. 10,201

5 Claims. (Cl. 244—22)

This invention relates to improvements in kites, and it has reference in particular to kites in the form of, or resembling airplanes; the principal objects of this invention being to provide a kite construction that is exceedingly light in weight; that is substantial and durable in use; that is easily sustained in flight; that is automatically rendered stable under varying wind conditions, and which may be made to simulate a stunting airplane in flight.

It is also an object of this invention to provide a kite construction as above stated that is relatively inexpensive to manufacture, that embodies relatively few parts, and is adapted to be made and shipped "knocked down" for subsequent assembly.

Further objects of this invention reside in the novel wing construction that permits flexibility, and which creates an air pocket formation therein producing an automatic stabilization of the kite in flight.

Other objects of the invention reside in the details of construction of the various parts, in their combination, and in their assembled relationship whereby they provide an exceedingly durable and flexible structure.

In accomplishing these and other objects of the invention, I have provided the improved details of construction, the preferred forms of which are illustrated in the accompanying drawings, wherein—

Fig. 1 is a perspective view of an airplane kite embodying details of construction in accordance with the present invention.

Fig. 2 is a plan view of reduced size, of one of the wing frames.

Fig. 3 is a side view of the longitudinal vertical frame, constituting a part of the fuselage.

Fig. 4 is a plan view of the longitudinal frame which constitutes the lower surface of the fuselage.

Fig. 5 is a front elevation of one of the wing bracing strut assemblies.

Fig. 6 is a front view of the landing gear assembly.

Fig. 7 is a front elevation of the kite.

Fig. 8 is a side sectional elevation as seen on the line 8—8 in Fig. 7.

Fig. 9 is a perspective view of an end portion of a wing frame structure.

Fig. 10 is an end view of the wing structure.

Referring more in detail to the drawings—

The present device is in the nature of an airplane kite, and it is planned that it may be made in various sizes and in various designs without departing from the spirit of the invention. In its present preferred form of construction, as illustrated, it comprises a plurality of frames that are separately constructed, and later are assembled to form the complete structure as seen in Fig. 1.

The structure is made to simulate the usual, or a common type of airplane, and it has parts corresponding to the fuselage, the wings, and landing gear, and other essential parts.

The part representing the fuselage is made up of two frames, A and B, separately illustrated in Figs. 3 and 4, respectively. The frame A, shown in Fig. 3, comprises a single strip of a durable, flexible material, such as bamboo, that is bent to form a rounded forward end nose 1, and vertically spaced top and bottom rails 2 and 3, which are joined together at spaced intervals along the length of the frame by vertical cross members 4. At the rear end of this frame, the upper and lower rails are joined by a vertical cross bar 5. Likewise the frame B, shown in Fig. 4, comprises a single strip of bamboo, or other suitable material, that is bent back upon itself to form a rounded forward end nose 7, and rearwardly converging opposite side rails 8 and 9, which are joined together at the rearward end of the frame. This frame also has a plurality of cross bars 10, joining the opposite side rails at spaced intervals.

In assembling these two frames A and B, the frame A is disposed upon the lower frame B at a right angle thereto, and along the medial, longitudinal line thereof; the lower frame being bent to conform to the slight curvature of the lower rail of the frame A. The rounded forward end of the frame B is attached to the forward end of the frame A, as at the point 11 in Fig. 8. Likewise, the rearward end of the frame B is attached to the rear end of the frame A, as at the point 12. The two frames A and B are co-extensive and are additionally secured together by suitable ties, or clips, that are applied at the points where the lower rail 3 of the frame A crosses the cross bars 10 of the lower frame.

The frame A also comprises a rearwardly and downwardly directed strut 13, assembled within its rearward portion, and this extends through and below the rear of the lower frame to serve as a tail skid, designated at 13' in Fig. 1. The two frames A and B are covered, on one side at least, with paper or other suitable covering material 14 to provide the wind surfaces for stabilization.

At the rearward end of the assembled frame structures is a horizontally disposed, covered frame 15 that extends equally to opposite sides and which serves as the laterals or stabilizer fins. Also, there is a vertically disposed, covered frame 16 attached to the rear end of frame A as a continuation thereof, and which serves as the rudder for the kite; these parts being suitably braced by the cords or wires 17, attached thereto, and to the frame structure in any suitable manner, for example, as shown in Fig. 1.

At the forward end of the fuselage are the upper and lower wings, designated, respectively, by C and D; the wing C being illustrated individually in Fig. 2, and this construction corresponds to that of the lower wing. The upper wing C is disposed transversely of and somewhat above the top rail of the longitudinal frame A. The lower wing D is disposed transversely of and against the under side of the horizontal frame B, and is tied thereto, as at the point 18 and 19. A pair of V frames are attached to the fuselage structure to support and brace the upper wing at its forward and rearward edges. Each of these V frames comprises opposite upwardly and outwardly diverging legs 20—20, which, at their lower ends are tied or otherwise attached in crossed relation to the lower longitudinal rail of the frame A, as at 21, and at points near their upper ends are likewise attached to the forward and rearward longitudinal rails of the wing. A cross piece 22 joins the legs midway between the wings to give these brace members strength and added rigidity, and these cross members are tied to the top rail of the Frame A, as seen at 23 in Fig. 7.

Near the forward end of the fuselage, is a triangular frame 25, shown individually in Fig. 6, and comprising outwardly and downwardly diverging legs 26—26, which are attached in crossed relation at their upper ends to the top rail 2 of the frame A, and at lower points as designated at 27 in Fig. 7, are tied to the opposite side rails of the frame B. Across their lower ends, these legs support a cross bar 30, which, at its ends, mounts the ground wheels 31.

In order that the slope of the wing C in a rearward direction may be adjusted to meet any required or desired condition for flying or stunting, the upwardly extended legs of the two V frames are provided in their inner edges with notches 34 at closely spaced intervals, adapted to receive the forward and rearward edge members of the wing therein, and by selectively locating the wing edges in these notches, the desired slope of the wing for any particular flying effect may be obtained. The supports are tied to the wings or secured thereto by means of suitable clips to retain the wing edges seated in said notches.

As will be observed by refrence to Fig. 1, the wings C and D each comprise two longitudinal strips 37—37 of flexible material such as bamboo, which form the opposite longitudinal edges of the wing. These strips, for the greater part of the wing length, are disposed flatly in a horizontal plane across the fuselage, but at their opposite ends are turned vertically edgewise, as will be clearly apparent by refrence to Fig. 9, and the ends of the two pieces are secured together in overlapped relation, as at 40. The physical characteristics of the bamboo strips causes them to tend to remain straight; thus the twisting in bringing them around the ends places the strips under tension, and the result is that the outer ends of the wings then have the tendency to curve upwardly, as will be apparent by reference to Fig. 7. Also, the twisting strain placed on the strips has a strong tendency to warp the wing transversely, thereby to form it with a longitudinal downwardly facing air pocket, as will be understood by reference to the end view of the wing as seen in Fig. 10.

In order to limit the extent of this pocketing, expanders 42 are placed across the wing frames near their ends, as illustrated in Figs. 1 and 10. These expanders are under compression, but are flexible and will yield or bow upwardly under additional compression. It is to be understood that the strips 37—37, forming the wing frames, are sufficiently flexible that under high wind pressure against the wings, the wing tips will bow upwardly, thereby adding stability to the construction, and since the upward bowing is in accordance with the extent of wind pressure, this stabilizing effect becomes automatic by reason of the fact that the greater the wind pressure, the greater will be the bowing. Also, as the wings thus curve upwardly, the compression stresses on the expanders 42 increase, and this causes them to yield or bow to a greater extent, and incident to this, there is an increased depth of the air pocket effect, which adds to the lifting effect of the wind and will cause the kite to rise rapidly.

It is to be understood that the wing frames are covered on their under sides with paper, cloth, or other suitable material to provide the necessary wind surfaces. Such a covering is designated at 50 in Fig. 1.

At the forward end of the fuselage is a propeller 52 freely revoluble on a supporting spindle 53. This propeller acts as a stabilizer for the kite.

In use, the toy is retained captive in flight by means of a suitable cord, as at 54, attached to a loop 55, from which loop connecting cords 56 and 57 extend, respectively, to the rearward and forward portions of the fuselage.

It is to be understood that while the present construction has been described primarily as for a toy, it is adaptable to gliders and the like for human transportation, and therefore it is not desired that the various details of construction shall be limited in use with toys.

Having thus described my invention, what I claim as new therein and desire to secure by Letters Patent is—

1. An airplane kite comprising a fuselage, having coextensive horizontal and vertical frames; the vertical frame being secured upon the horizontal frame at its central, longitudinal line, and each of said frames having a covering material, and wings secured to the fuselage across its forward portion; said securing means comprising struts fixed to the fuselage and having means thereon for effecting holding connections with the wing frames at different positions along the struts, thereby to provide for change in the wing slope.

2. An airplane kite comprising a fuselage construction, wing supporting struts secured thereto, a wing disposed transversely of the fuselage and supported at its forward and rearward edges by said struts; said struts having notches at spaced intervals therealong to receive the edges of the wing therein for different slope adjustment.

3. In an airplane kite, the combination with a fuselage construction, of a forward and rearward set of wing supporting struts secured to the fuselage at a medial line and extending laterally and upwardly; each of said struts having a series of notches spaced therealong to receive therein the forward and rearward edge portions of the wing to retain the latter at any definite setting and, said wings being flexible to permit upward bending of the outer end portions in accordance with wind pressure thereagainst.

4. An airplane kite having a fuselage, comprising a central longitudinal vertical frame, and a horizontal frame secured to the lower longitudinal member of the vertical frame, a rudder member, and lateral stabilizers secured to the rear end of said fuselage, a propeller blade pivotally mounted at the forward end to be revolved by wind action, thereby to serve as a stabilizer, upper and lower flexible wings secured to the fuselage by means permitting upward flexing of the wing ends in accordance with wind pressure thereagainst; and resilient expander bars secured transversely in the wing frames within the outer end portions thereof.

5. In an airplane kite, a fuselage, a wing secured transversely thereof; said wing having a frame comprising opposite edge strips of resilient material permitting upward bowing of the wing ends and joined together across the ends of the wing in a manner whereby their resiliency effects an upward warping of the wing, and resilient expander bars fixed in the outer end portions of the wing frames transversely thereof.

ARTHUR H. TREVOR.